United States Patent

Cao et al.

[11] Patent Number: 6,088,142
[45] Date of Patent: Jul. 11, 2000

[54] SYSTEM AND METHOD FOR PRECISION WAVELENGTH MONITORING

[75] Inventors: Xiaofan Cao, San Mateo; Yu Zheng, Sunnyvale, both of Calif.

[73] Assignee: Oplink Communications, Inc., San Jose, Calif.

[21] Appl. No.: 08/816,089

[22] Filed: Mar. 13, 1997

[51] Int. Cl.[7] .................................................. H04B 10/04
[52] U.S. Cl. ............................ 359/132; 359/187; 372/20
[58] Field of Search .................... 359/132, 187; 250/226; 372/20, 29, 33, 96

[56] References Cited

U.S. PATENT DOCUMENTS

| | | | |
|---|---|---|---|
| 4,168,107 | 9/1979 | Sauter | 359/130 |
| 4,485,475 | 11/1984 | Large et al. | 359/132 |
| 5,029,981 | 7/1991 | Thompson | 359/130 |
| 5,299,045 | 3/1994 | Sekiguchi | 359/130 |
| 5,410,404 | 4/1995 | Kersey et al. | 356/345 |
| 5,642,448 | 6/1997 | Pan et al. | 385/31 |
| 5,646,399 | 7/1997 | Fukushima et al. | 250/226 |
| 5,691,989 | 11/1997 | Rakuljic | 372/20 |
| 5,777,763 | 7/1998 | Tomlinson, III | 359/130 |
| 5,818,857 | 10/1998 | Palmer | 372/32 |

*Primary Examiner*—Leslie Pascal
*Attorney, Agent, or Firm*—Sawyer & Associates

[57] ABSTRACT

A system and method for monitoring a wavelength of light produced by a light source is disclosed. The system and method comprise a diffractor for diffracting the light. A first portion of the light is transmitted without diffraction and has a propagation direction. A second portion of the light has a predetermined wavelength and is diffracted through a predetermined angle from the propagation direction. The system also comprises a plurality of filters at the predetermined angle from the propagation direction from the diffractor. The filters transmit light of the predetermined wavelength. The system also comprises a plurality of photodiodes. Each photodiode provides a signal corresponding to an intensity of light and corresponds to a one of the plurality of filters. Each photodiode is placed behind a corresponding filter. According to the system and method disclosed, the system and method monitor the wavelength without significant interruption of the beam. The system and method are also compact, low in cost and require very little alignment. Consequently, overall system performance is increased.

28 Claims, 7 Drawing Sheets

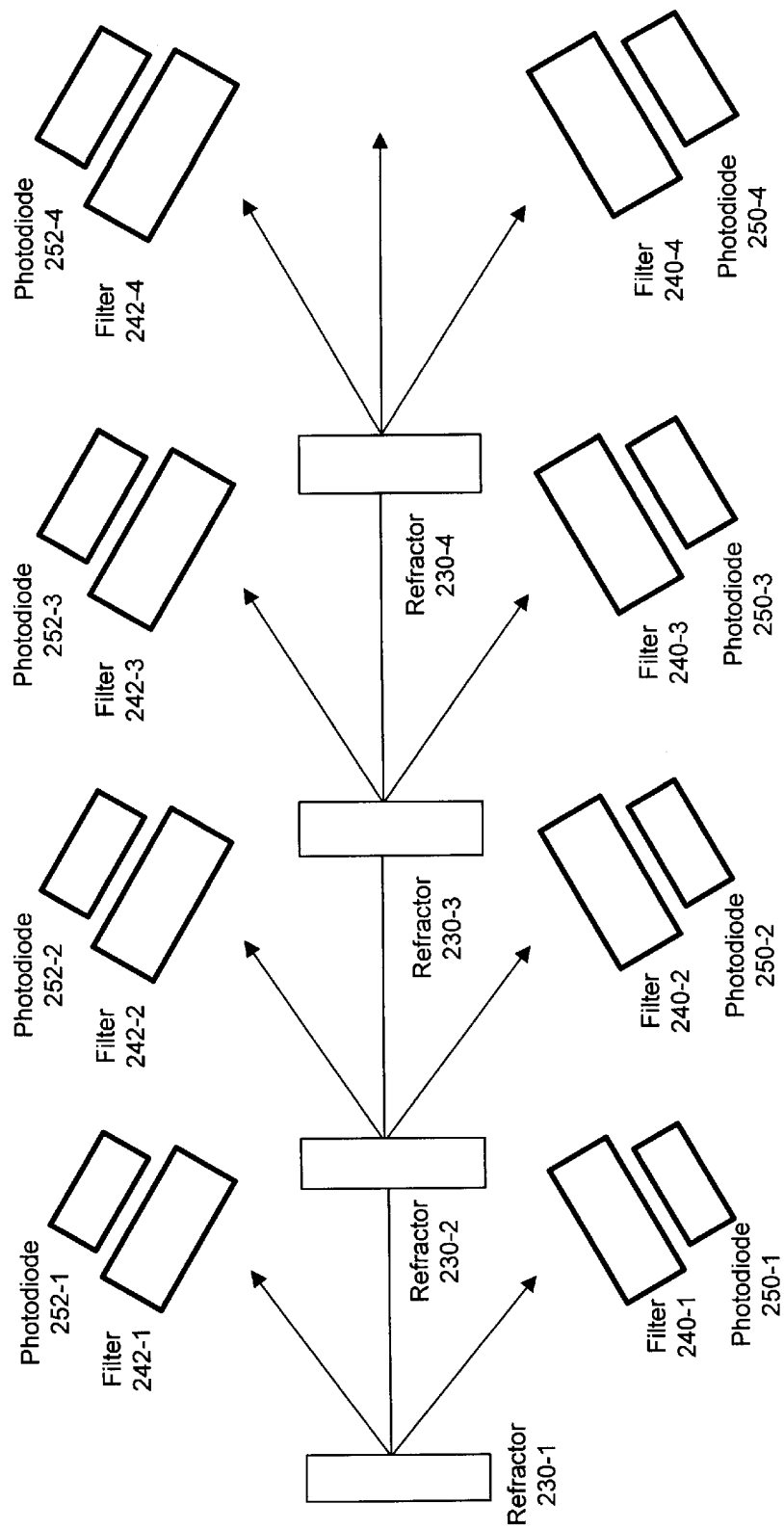

SYSTEM AND METHOD FOR PRECISION WAVELENGTH MONITORING

FIELD OF THE INVENTION

The present invention relates to a method and system for providing a wavelength locker and more particularly to a method and system for monitoring and controlling the wavelength without significant interruption of the transmitted light.

BACKGROUND OF THE INVENTION

In several communications networks, trunk lines are reaching the limit of data-transmission capacity. Wavelength-division multiplexing (WDM) is a cost-effective means to boost capacity without the need to install new fiber or upgrade bandwidth per channel. In WDM systems, data are transmitted over multiple, closely spaced wavelengths, or channels, increasing the capacity of a single transmission line many times over; WDM systems under test feature from four (4) to forty (40) channels.

In communications, the channel crosstalk must be kept below 25 Db, which requires the wavelength drift of transmitters for dense WDM systems to be small compared to channel separation. The suggested grid for channel wavelengths is 1552.52 nm+−n*0.8 nm, where n is the channel number (1, 2, 3 and so forth). Without wavelength locking, WDM system designers must sift through lasers to find sources with wavelengths matching system-channel definitions. Currently, WDM laser transmitters can be specified to within 0.4 nm, with a wavelength stability of 0.02 nm/year over 20 years. Although this is acceptable for a channel spacing of 1.6 nm, it is certainly not appropriate for a channel spacing of 0.8 nm, unless transmitters are periodically serviced, an undesirable scenario.

Single-mode diode lasers such as distributed-feedback lasers are commonly operated using thermoelectric coolers for temperature, and, hence, wavelength stabilization. While this technique is adequate over short periods, over the long term laser emission wavelength tends to drift over time.

Conventional wavelength lockers monitor and control the wavelength of light produced by a light source. Conventional light sources are lasers, often distributed feedback Bragg reflective ("DFB") lasers. A DFB laser is typically tuned to produce light of a predetermined wavelength. However, as a DFB laser is used, the current generated in the cavity changes the resonant characteristics of the cavity. Consequently, the wavelength of the light produced by a DFB laser drifts from the predetermined wavelength as the DFB laser is used.

In conventional wavelength lockers, light from the DFB laser is transmitted to a collimator and travels down a fiber. Conventional systems monitor the wavelength of the incoming light by transmitting the beam to a spectrum analyzer. The spectrum analyzer determines the wavelengths which comprise the beam of light. The spectrum analyzer transfers the information on the wavelength to a feedback system. The feedback system uses this information to change the temperature of the DFB laser to compensate for any drift in the wavelength of the light from the predetermined value.

Optimizing signal-to-noise ratios throughout the system directly affects performance and can eliminate the use of unnecessary amplifiers. Therefore, WDM systems are designed, installed, verified and monitored using the following measurements:

Carrier wavelengths and powers

In any optical transmission system the wavelength and power of the laser transmitter is important. This is particularly true for WDM systems, in which accurate wavelengths are necessary to avoid interference with adjacent channels and accurate amplitude levels are required to account for loss and amplifier efficiency at different wavelengths. Measuring carrier wavelengths optimizes for system components. Measuring carrier powers optimizes for transmitter reliability and system performance.

Channel spacing

In a WDM system it is critical that the difference between any two channels (the channel spacing) be adhered to. Filters are used to ensure that optical transmitters operate only within their designated channels. Measuring this fundamental specification enables optimization for system components and performance.

Flatness

The relative power levels between channels throughout the WDM system are referred to as flatness. In some systems, to account for the gain variations of the optical amplifiers at different wavelengths, carrier levels are purposely offset from each other. By measuring the relative differences between carrier levels in the system, the flatness can be determined. Measurements of flatness can help optimize for system components and performance.

Drift

Drift in carrier wavelength is the change in wavelength over time caused by temperature, laser instability, degradation, etc. If a transmitter drifts in a system, it may approach the edge of the channel filters, reducing transmitted power. The result will be increased system error and, eventually, channel failure. Measuring the drift of the optical carriers in a WDM system will provide an indication of overall system stability and verification of performance.

Signal-to-noise ratio

The signal-to-noise ratio for each channel is one of the most important measurements in an optical transmission system. During a signal-to-noise ratio measurement, the absolute power of the carrier (in dBm) is compared with the absolute power of the noise (at the carrier wavelength). Since noise power varies with measurement bandwidth (a wide bandwidth allows more noise to the detector than a narrow bandwidth), the noise bandwidth used during the measurement must be accounted for. Typically, this means normalizing the noise power measurement to a known bandwidth (such as 1 Hz or the analog bandwidth as defined in the SONET/SDH standards). Measuring this parameter enables optimization for system performance.

Although the conventional systems are capable of determining and controlling the wavelength of light produced by a DFB laser, those with ordinary skill in the art will realize that the spectrum analyzer disrupts the beam. In order for the spectrum analyzer to determine the wavelengths comprising the incoming light, the spectrum analyzer is given access to the entire beam. In addition, the spectrum analyzer is bulky and expensive. Consequently, any conventional system for monitoring controlling the wavelength of light in a wavelength locker will be costly and relatively large.

Accordingly, what is needed is a system and method for providing a wavelength locker in which the wavelength of the transmitted light is monitored without significant interruption of the light. In addition, it would be beneficial if the system was less bulky, cheaper and easier to manufacture. The present invention addresses such a need.

SUMMARY OF THE INVENTION

The present invention provides a method and system for monitoring a wavelength of light produced by a light source. The system and method comprise a diffractor for diffracting the light. A first portion of the light is transmitted without diffraction and has a propagation direction. A second portion of the light has a predetermined wavelength and is diffracted through a predetermined angle from the propagation direction. The system also comprises a plurality of filters at the predetermined angle from the propagation direction from the diffractor. The filters transmit light of the predetermined wavelength. The system also comprises a plurality of photodiodes. Each photodiode provides a signal corresponding to an intensity of light and corresponds to a one of the plurality of filters. Each photodiode is placed behind a corresponding filter.

According to the system and method disclosed herein, the present invention monitors the wavelength without significant interruption of the beam. The system and method are also compact, low in cost and requires very little alignment. Overall system performance is thereby increased.

BRIEF DESCRIPTION OF THE DRAWINGS

FIG. 7 depicts a system for monitoring a plurality of wavelengths without significantly disrupting the transmitted beam.

DETAILED DESCRIPTION OF THE INVENTION

The present invention relates to an improvement in monitoring and controlling wavelength, for example in a wavelength locker. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope limited to the embodiment shown but is to be accorded the widest scope consistent with the principles and features described herein.

Figure 1:
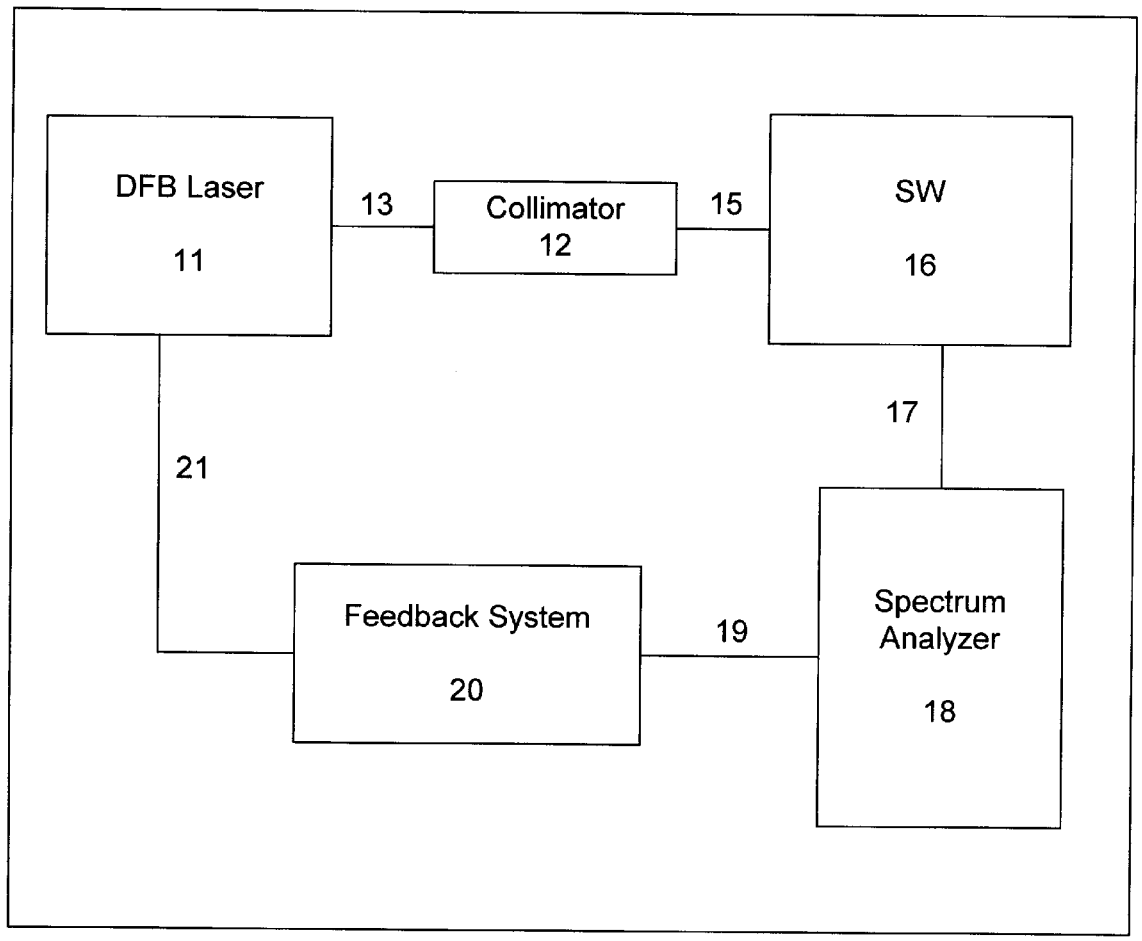
FIG. 1 is a block diagram of a conventional system for monitoring and controlling the wavelength of light in a wavelength locker.

FIG. 1 is a block diagram of a conventional system 10 for monitoring and controlling the wavelength of light in a wavelength locker. The light source 11 is a distributed feedback Bragg reflective ("DFB") laser. The DFB laser is tuned to produce light of a predetermined wavelength. As the DFB laser 11 is used, the current generated in the cavity changes the characteristics of the cavity. Consequently, the wavelength of the light generated by the DFB laser 11 drifts from the predetermined wavelength as the DFB laser 11 is used.

Light from the DFB laser 11 is then transmitted to collimator 12 and travels down the fiber 13. In order to monitor the wavelength of the incoming light, the beam is transmitted through the system 10 to the spectrum analyzer 18. The spectrum analyzer 18 determines the wavelengths which comprise the beam of light transmitted through the fiber 17. The spectrum analyzer 18 then feeds the information on the wavelength of the light produced to the feedback system 20. The feedback system 20 then uses this information to change the temperature of the DFB laser 11 to compensate for any drift in the wavelength of the light from the predetermined value.

Although the system 10 shown in FIG. 1 is capable of determining and controlling the wavelength of light produced by the DFB laser 11, those with ordinary skill in the art will realize that the system 10 disrupts the beam. In order for the spectrum analyzer 18 to determine the wavelengths comprising the incoming light, the spectrum analyzer 18 is given access to the entire beam. In addition, the spectrum analyzer 18 is bulky and expensive. Consequently, any conventional system 10 for monitoring controlling the wavelength of light in a wavelength locker will be costly and relatively large.

The present invention provides for a method and system for monitoring and controlling the wavelength of light. The present invention will be described in terms of a wavelength locker using a DFB laser as a light source. However, one of ordinary skill in the art will readily recognize that this method and system will operate effectively for other types of lasers and other systems in which the wavelength of light must be monitored or controlled.

Figure 2:
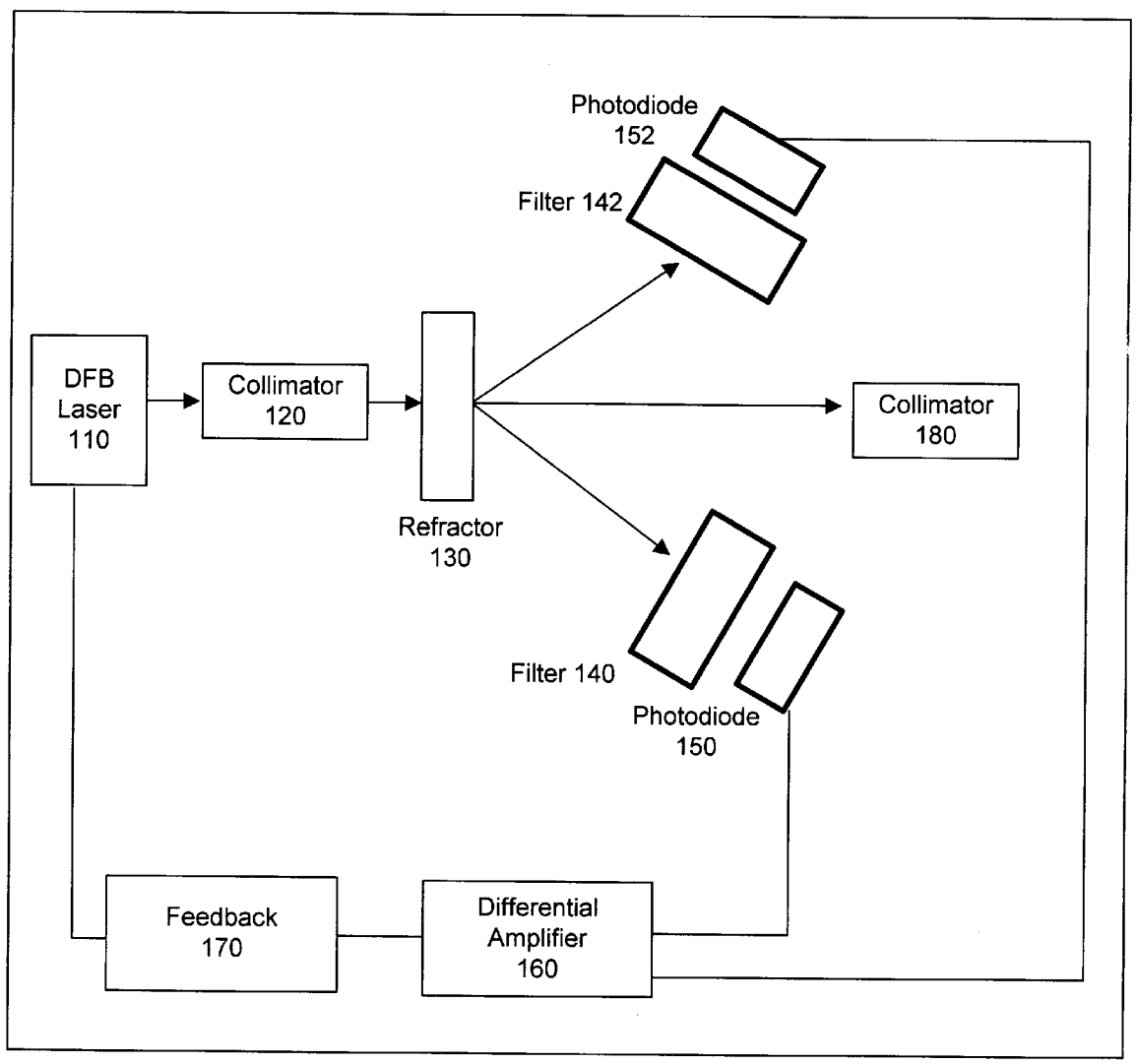
FIG. 2 is a block diagram of a first embodiment for monitoring and controlling multiple wavelengths in accordance with the present invention.

To more particularly illustrate the system and method in accordance with the present invention, refer now to FIG. 2 depicting a block diagram of one embodiment 100 of such a system. The system 100 includes a DFB laser 110 as a light source. The DFB laser 110 is tuned to produce light of a predetermined wavelength, $l_1$. The light from DFB laser 110 travels through the collimator 120 to the diffractor 130. When the DFB laser 100 produces light of wavelength $l_1$, the diffractor 130 diffracts light of a second predetermined wavelength, $l_2$, in equal intensities through a predetermined angle t. The transmitted light passes to the collimator 180 for use in an application. Diffractor 130 serves as a tap coupler. This tap coupler is insensitive to temperature, incoming wavelength and the state of the polarization. It is inherently insensitive to the temperature and to incoming wavelengths. It is insensitive to polarization because the incoming light is normal to the diffraction.

The filters 140 and 142 are placed at the predetermined angle t from the predetermined wavelength, $l_2$. Filters 140 and 142 could be, for example, bypass filters or they could be etalon filters. One of ordinary skill in the art will readily recognize tht these filters could be a variety of types and still be utilzed within the spirit and scope of the present invention. When the DFB laser 110 is producing light having wavelength $l_1$, light of wavelength $l_2$ diffracted by the diffractor 130 travels in equal intensities at the angle t from the direction of transmission to the collimator 180.

In one embodiment of the system 100, approximately 94% of the light from DFB, for example, laser 110 is transmitted to the collimator 180. In such an embodiment of the system 100, approximately 3% of the light is diffracted to each of the filters 140 and 142. Each filter 140 and 142 has a photodiode, 150 and 152, respectively, placed to receive light transmitted by each filter 140 and 142.

Because the filters and photodiodes are placed at the angle t from the direction of transmission to the collimator 180, when the DFB laser 110 produces light of wavelength $l_1$, the intensity of light of wavelength $l_2$ at each filter 140 and 142 is equal. Thus, the intensity of light at each photodiode 150 and 152 and the signal from each photodiode 150 and 152 are equal. When the wavelength of the light produced by DFB laser 110 drifts from $l_1$, the intensity of the light having wavelength $l_2$ differs at each filter 140 and 142. Thus, when the DFB laser 110 no longer produces light of wavelength $l_2$, the intensity of light at each photodiode and the signal from each photodiode 150 and 152 differs. This difference in intensity the of the light received by photodiodes 150 and 152 indicates the magnitude and direction of the drift in wavelength of the light produced by the DFB laser 110.

The signals indicating the intensity of light received by photodiodes 150 and 152 are sent to the differential amplifier 160. The differential amplifier 160 calculates the difference in the signals from photodiodes 150 and 152. The difference in the intensity of light received by photodiodes 150 and 152 indicates the magnitude and direction of the drift in wavelength of the light produced by the DFB laser 110. Thus, the difference in the signals from photodiodes 150 and 152 also indicates the magnitude and direction, whether to higher or lower wavelengths, of the drift.

After calculating the difference in the signals, the differential amplifier 160 sends this difference to feedback circuit 170. In response to the signal from the differential amplifier 160, the feedback circuit 170 raises or lowers the temperature of the cavity of the DFB laser 110 as required to bring the wavelength of the light produced by the DFB laser 110 back to $l_1$.

In comparison to the system 10 for monitoring and controlling the wavelength of DFB laser 11 shown in FIG. 1, the system 100 of FIG. 2 requires significantly less disruption of the transmitted beam. In addition, because off the shelf diffractors, photodiodes, and filters can be used, the system 100 is low cost and compact. Finally, unlike the spectrum analyzer 18 of FIG. 1, the system of FIG. 2 requires relatively little alignment.

Figure 3:
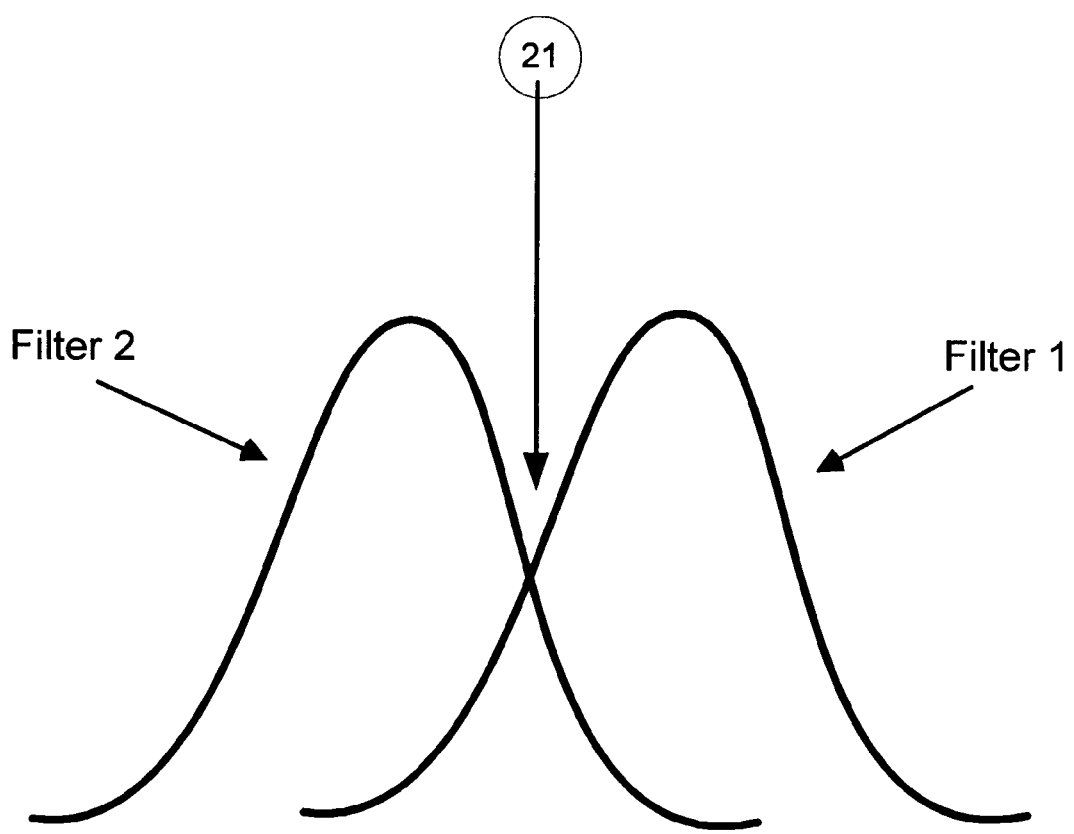
FIG. 3 are waveforms showing the operation of the wavelength locker in accordance with the present invention.

FIG. 3 are waveforms showing the operation of the system of FIG. 2. $\lambda 1$ is representative of the wavelength that should be locked.

Figure 4:
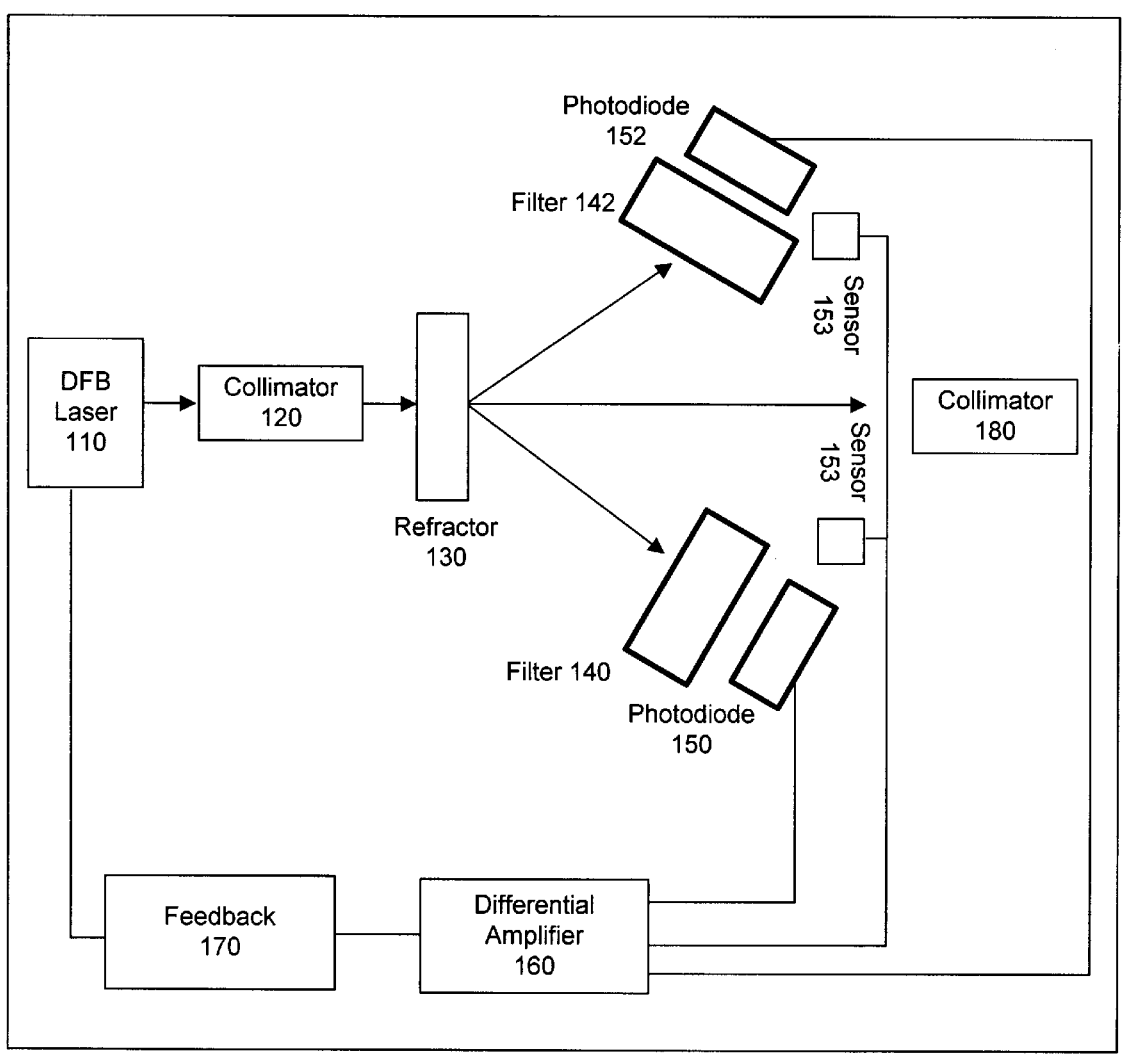
FIG. 4 is a block diagram of a second embodiment for monitoring and controlling multiple wavelengths in accordance with the present invention.

It is important to be able to compensate the system 100 for temperature. FIG. 4 shows a system 100' which includes a sensor arrangement. System 100' has similar elements to that of FIG. 2 but it also includes a sensor 153 for each of the photodiodes 150' and 152'. The sensors are coupled to the differential amplifier 160' to allow the differential amplifier to modify the amplitude by the poles of the photodiodes. In so doing, the wavelength locker response is significantly improved.

Figure 5:
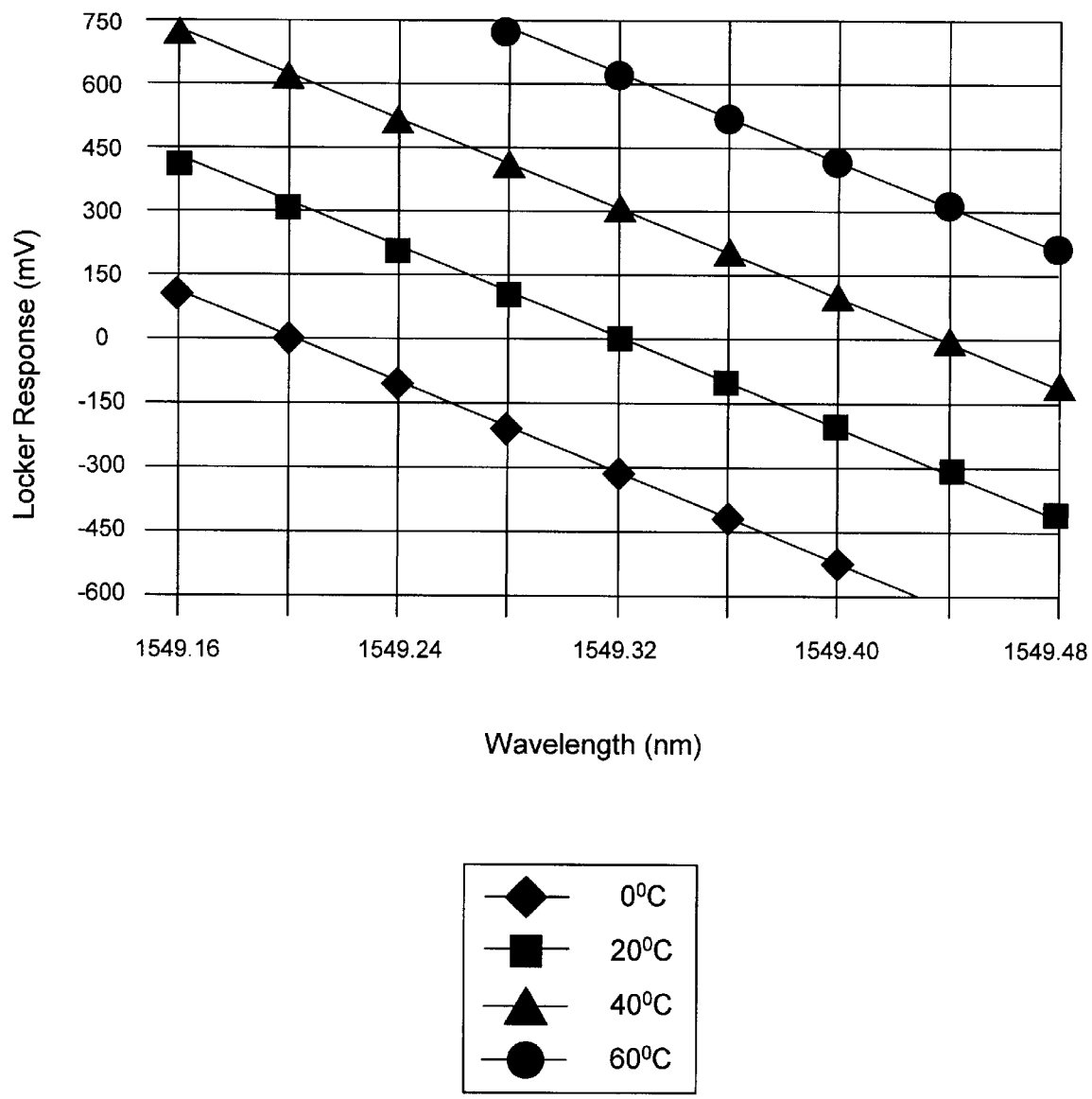
FIGS. 5 and 6 are graphs of laser response various wavelength for a wavelength locker without temperature compensation.
Figure 6:
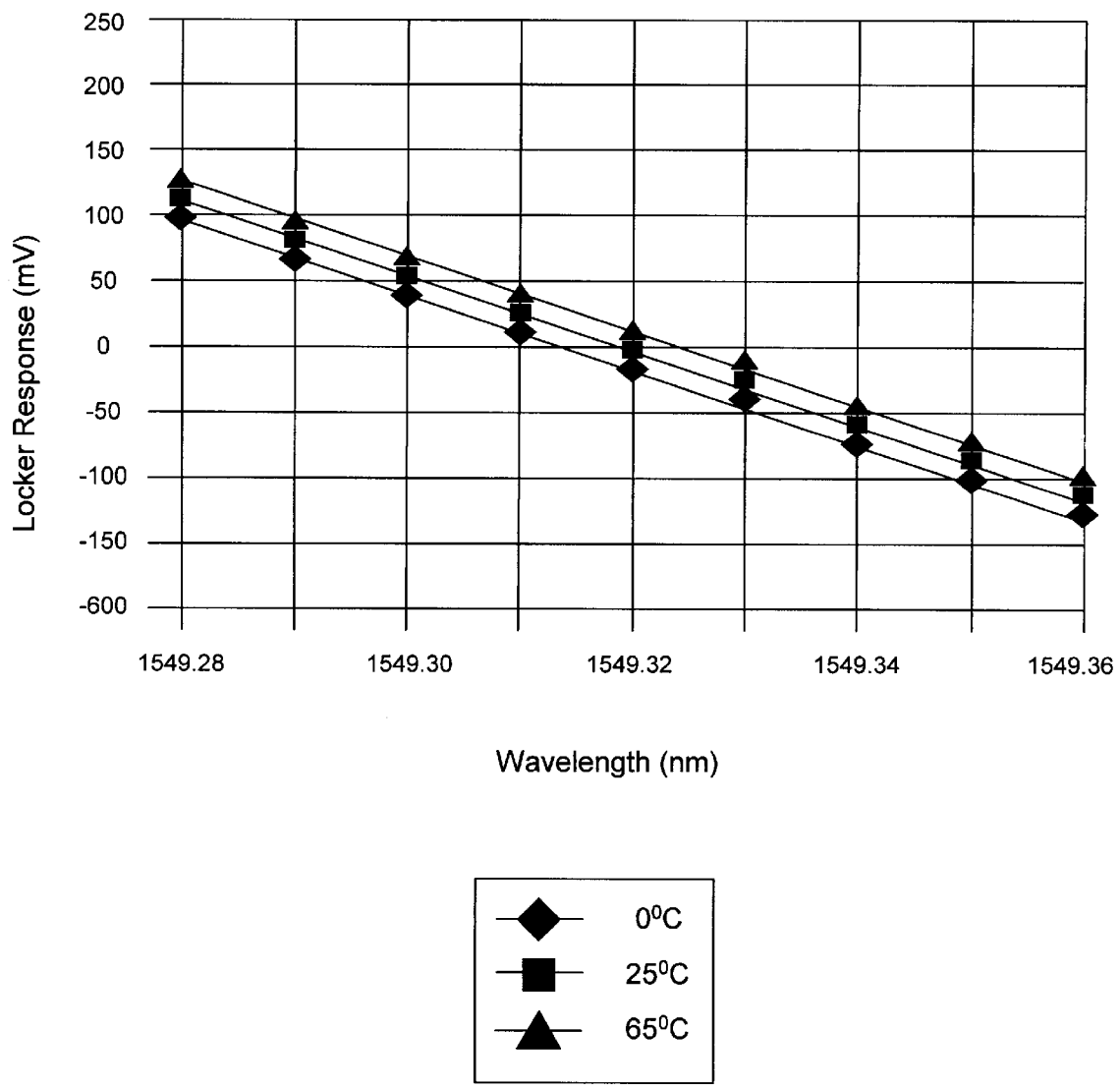

FIGS. 5 and 6 are graphs of laser response versus wavelength for a wavelength locker without temperature compensation. As is seen the wavelength locker response is much more consistent with temperature compensation.

The signals from a variety of wavelengths can also be monitored or used to control an apparatus. FIG. 7 depicts a system 200 for monitoring a plurality of wavelengths without significantly disrupting the transmitted beam. A plurality of diffractors 230-1 through 230-4 is are placed in a beam of light. Each diffractor 230-1 through 230-4 diffracts light of a predetermined wavelength,$l_1$ through $l4$, through a corresponding predetermined angle t1 through t4. Each diffractor, 230-1 through 230-4, has two associated filters 240-1 through 240-4 and 242-1 through 242-4. Each set of filters 240-1 through 240-4 and 242-1 through 242-4 are placed at angles of t1 through t4 from the transmitted beam. Each filter 240-1 through 240-4 and 242-1 through 242-1 has a corresponding photodiode, 250-1 through 250-4 and 252-1 through 252-4.

Each diffractor 230-1 through 230-4, its corresponding filters 240-1 through 240-4 and 242-1 through 242-4, and the associated photodiodes 250-1 through 250-4 and 252-1 through 252-4 have the same function as the combination of the diffractor 130, the filters 140 and 142, and the photodiodes 150 and 152 of FIG. 2. Referring back to FIG. 3, the system 200 can monitor four wavelengths. Nothing prevents the construction of a system monitoring a different number of wavelengths. In addition, the signal from each photodiode, 250-1 through 250-4 and 252-1 through 252-4, can be used to control a light source or other apparatus.

A method and system has been disclosed for monitoring and controlling wavelength of a transmitted beam has disclosed. According to the method and system, the wavelength can be monitored and controlled with very little disruption of the transmitted beam. Also, if a temperature sensor arrangement is utilized a system and method in accordance with the present invention provides for consistent and accurate performance. In addition, the system and method are low in cost, compact, easy to manufacture, and require very little alignment.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for monitoring a wavelength of light produced by a light source comprising:

a diffractor for diffracting the light produced by the light source, a first portion of the light being transmitted without diffraction, the first portion of light having a propagation direction, a second portion of the light having predetermined wavelength, the second portion of the light being diffracted through a predetermined angle from the propagation direction;

a plurality of filters for transmitting light of the predetermined wavelength, each of the plurality of filters being at the predetermined angle from the propagation direction from the diffractor, the plurality of filters receiving only the second portion of the light and for transmitting a third portion of the light; and a plurality of photodiodes for receiving the third portion of the light, each photodiode for providing a signal corresponding to an intensity of light, each photodiode corresponding to a one of the plurality of filters, each photodiode being placed behind a corresponding filter.

2. The system of claim 1 wherein the light source is a DFB laser.

3. The system of claim 2 further comprising a differential amplifier for determining the difference in the intensity of light having the predetermined wavelength at each photodiode.

4. A system for monitoring and controlling a wavelength of light produced by a light source comprising:

a diffractor for diffracting the light produced by the light source, a first portion of the light being transmitted without diffraction, the first portion of light having a propagation direction, a second portion of the light having predetermined wavelength, the second portion of the light being diffracted through a predetermined angle from the propagation direction;

a plurality of filters for transmitting light of the predetermined wavelength being, each of the plurality of filters being at the predetermined angle from the propagation direction from the diffractor, the plurality of filters receiving only the second portion of the light and for transmitting a third portion of the light;

a plurality of photodiodes for receiving the third portion of the light, each photodiode for providing a signal corresponding to an intensity of light, each photodiode corresponding to a one of the plurality of filters, each photodiode being placed behind a corresponding filter; and a means for controlling the wavelength coupled to the plurality of photodiodes.

5. The system of claim 4 wherein the controlling means further comprise:

a differential amplifier coupled to the plurality of photodiodes, the differential amplifier for determining the difference in the signals from each photodiode.

6. The system of claim 5 wherein the controlling means further comprise feedback means coupled to the differential amplifier for controlling a temperature of the light source.

7. The system of claim 6 wherein the light source is a differential feedback Bragg reflective laser.

8. A system for monitoring a plurality of wavelengths of light produced by a light source comprising:

a plurality of diffractors for diffracting the light produced by the light source, a first portion of the light being transmitted through each diffractor without diffraction, the first portion of light having a propagation direction, a plurality of portions of the light having a plurality of predetermined wavelengths, each of the plurality of portions of the light having a particular predetermined wavelength of the plurality of predetermined wavelengths, each portion of the light having a particular predetermined wavelength being diffracted through a particular predetermined angle from the propagation direction from a corresponding particular diffractor of the plurality of diffractors;

a plurality of filters, each portion of the plurality filters corresponding to a particular diffractor of the plurality of diffractors, each portion of the plurality of filters being at the particular predetermined angle from the propagation direction from the corresponding particular diffractor, and each filter of the portion of the plurality of filters for transmitting light of the particular predetermined wavelength of the plurality of wavelengths, the plurality of filters receiving only the plurality of portions of the light and for transmitting a second portion of the light; and a plurality of photodiodes for receiving the second portion of the light, each photodiode for providing a signal corresponding to an intensity of light, each photodiode corresponding to a one of the plurality of filters, each photodiode being placed behind a corresponding filter.

9. The system of claim 8 wherein the light source is a DFB laser.

10. The system of claim 9 further comprising a differential amplifier for determining the difference in the intensity of light having the predetermined wavelength at each photodiode.

11. A system for monitoring and controlling a plurality of wavelengths of light produced by a light source comprising:

a plurality of diffractors for diffracting the light produced by the light source, a first portion of the light being transmitted through each diffractor without diffraction, the first portion of light having a propagation direction, a plurality of portions of the light having a plurality of predetermined wavelengths, each of the plurality of portions of the light having a particular predetermined wavelength of the plurality of predetermined wavelengths, each portion of the light having a particular predetermined wavelength being diffracted through a particular predetermined angle from the propagation direction from a corresponding particular diffractor of the plurality of diffractors;

a plurality of filters, each portion of the plurality filters corresponding to a particular diffractor of the plurality of diffractors, each portion of the plurality of filters being at the particular predetermined angle from the propagation direction from the corresponding particular diffractor, and each filter of the portion of the plurality of filters for transmitting light of the particular predetermined wavelength of the plurality of wavelengths, the plurality of filters receiving only the plurality of portions of the light and for transmitting a second portion of the light;

a plurality of photodiodes for receiving the second portion of the light, each photodiode for providing a signal corresponding to an intensity of light, each photodiode corresponding to a one of the plurality of filters, each photodiode being placed behind a corresponding filter; and means for controlling the plurality of wavelengths coupled to the plurality of photodiodes.

12. The system of claim 11 wherein the controlling means further comprise:

a differential amplifier coupled to the plurality of photodiodes, the differential amplifier for determining the difference in the signals from each photodiode.

13. The system of claim 12 wherein the controlling means further comprise feedback means coupled to the differential amplifier for controlling a temperature of the light source.

14. The system of claim 13 wherein the light source is a differential feedback Bragg reflective laser.

15. A method for monitoring a wavelength of light produced by a light source comprising the steps of:

(a) providing a diffractor for diffracting the light produced by the light source, a first portion of the light being transmitted without diffraction, the first portion of light having a propagation direction, a second portion of the light having predetermined wavelength, the second portion of the light being diffracted through a predetermined angle from the propagation direction;

(b) providing a plurality of filters being at the predetermined angle from the propagation direction from the diffractor, the filters for transmitting light of the predetermined wavelength, the plurality of filters receiving only the second portion of the light and for transmitting a third portion of the light; and (c) providing a plurality of photodiodes for receiving the third portion of the light, each photodiode for providing a signal corresponding to an intensity of light, each photodiode corresponding to a one of the plurality of filters, each photodiode being placed behind a corresponding filter.

16. The method of claim 15 wherein the light source is a DFB laser.

17. The method of claim 16 further comprising the step of:

(d) providing a differential amplifier for determining the difference in the intensity of light having the predetermined wavelength at each photodiode.

18. A method for monitoring and controlling a wavelength of light produced by a light source comprising the steps of:

(a) providing a diffractor for diffracting the light produced by the light source, a first portion of the light being transmitted without diffraction, the first portion of light having a propagation direction, a second portion of the light having predetermined wavelength, the second portion of the light being diffracted through a predetermined angle from the propagation direction;

(b) providing a plurality of filters being at the predetermined angle from the propagation direction from the diffractor, the filters for transmitting light of the predetermined wavelength, the plurality of filters receiving only the second portion of the light and for transmitting a third portion of the light;

(c) providing a plurality of photodiodes for receiving the third portion of the light, each photodiode for providing a signal corresponding to an intensity of light, each photodiode corresponding to a one of the plurality of filters, each photodiode being placed behind a corresponding filter; and (d) providing means for controlling the wavelength coupled to the plurality of photodiodes.

19. The method of claim 18 wherein the controlling means providing step (d) further comprises the step of:

(d1) providing a differential amplifier coupled to the plurality of photodiodes, the differential amplifier for determining the difference in the signals from each photodiode.

20. The method of claim 19 wherein the controlling means providing step (d) further comprises (d2) providing feedback means coupled to the differential amplifier for controlling a temperature of the light source.

21. The method of claim 20 wherein the light source is a differential feedback Bragg reflective laser.

22. A method for monitoring a plurality of wavelengths of light produced by a light source comprising the steps of:

(a) providing a plurality of diffractors for diffracting the light produced by the light source, a first portion of the light being transmitted through each diffractor without diffraction, the first portion of light having a propagation direction, a plurality of portions of the light having a plurality of predetermined wavelengths, each of the plurality of portions of the light having a particular predetermined wavelength of the plurality of predetermined wavelengths, each portion of the light having a particular predetermined wavelength being diffracted through a particular predetermined angle from the propagation direction from a corresponding particular diffractor of the plurality of diffractors;

(b) providing a plurality of filters, each portion of the plurality filters corresponding to a particular diffractor of the plurality of diffractors, each portion of the plurality of filters being at the particular predetermined angle from the propagation direction from the corresponding particular diffractor, and each filter of the portion of the plurality of filters for transmitting light of the particular predetermined wavelength of the plurality of wavelengths, the plurality of filters receiving only the plurality of portions of the light and for transmitting a second portion of the light; and (c) providing a plurality of photodiodes for receiving the second portion of the light, each photodiode for providing a signal corresponding to an intensity of light, each photodiode corresponding to a one of the plurality of filters, each photodiode being placed behind a corresponding filter.

23. The method of claim 22 wherein the light source is a DFB laser.

24. The method of claim 23 further comprising the step of:

(d) providing a differential amplifier for determining the difference in the intensity of light having the predetermined wavelength at each photodiode.

25. A method for monitoring and controlling a plurality of wavelengths of light produced by a light source comprising the steps of:

(a) providing a plurality of diffractors for diffracting the light produced by the light source, a first portion of the light being transmitted through each diffractor without diffraction, the first portion of light having a propagation direction, a plurality of portions of the light having a plurality of predetermined wavelengths, each of the plurality of portions of the light having a particular predetermined wavelength of the plurality of predetermined wavelengths, each portion of the light having a particular predetermined wavelength being diffracted through a particular predetermined angle from the propagation direction from a corresponding particular diffractor of the plurality of diffractors;

(b) providing a plurality of filters, each portion of the plurality filters corresponding to a particular diffractor of the plurality of diffractors, each portion of the plurality of filters being at the particular predetermined angle from the propagation direction from the corresponding particular diffractor, and each filter of the portion of the plurality of filters for transmitting light of the particular predetermined wavelength of the plurality of wavelengths, the plurality of filters receiving only the plurality of portions of the light and for transmitting a second portion of the light;

(c) providing a plurality of photodiodes for receiving the second portion of the light, each photodiode for providing a signal corresponding to an intensity of light, each photodiode corresponding to a one of the plurality of filters, each photodiode being placed behind a corresponding filter; and (d) providing means for controlling the plurality of wavelengths coupled to the plurality of photodiodes.

26. The method of claim 25 wherein the controlling means providing step further comprises the step of:

(d1) providing a differential amplifier coupled to the plurality of photodiodes, the differential amplifier for determining the difference in the signals from each photodiode.

27. The method of claim 26 wherein the controlling means providing step further comprises the step of:

(d2) providing feedback means coupled to the differential amplifier for controlling a temperature of the light source.

28. The method of claim 27 wherein the light source is a differential feedback Bragg reflective laser.

* * * * *